US012602240B2

(12) United States Patent
Chen

(10) Patent No.: US 12,602,240 B2
(45) Date of Patent: Apr. 14, 2026

(54) REMOTE EDGE VIRTUALIZATION MANAGEMENT

(71) Applicant: VMware LLC, Palo Alto, CA (US)

(72) Inventor: Tiejun Chen, Beijing (CN)

(73) Assignee: VMware LLC, Palo Alto, CA (US)

( * ) Notice: Subject to any disclaimer, the term of this patent is extended or adjusted under 35 U.S.C. 154(b) by 798 days.

(21) Appl. No.: 17/886,885

(22) Filed: Aug. 12, 2022

(65) Prior Publication Data

US 2024/0028368 A1     Jan. 25, 2024

(30) Foreign Application Priority Data

Jul. 19, 2022    (WO) ................ PCT/CN2022/106455

(51) Int. Cl.
| | |
|---|---|
| *H04L 51/21* | (2022.01) |
| *G06F 9/455* | (2018.01) |
| *H04L 67/562* | (2022.01) |

(52) U.S. Cl.
CPC .......... *G06F 9/45558* (2013.01); *H04L 51/21* (2022.05); *H04L 67/562* (2022.05); *G06F 2009/45595* (2013.01)

(58) Field of Classification Search
CPC ....... G06F 9/45558; G06F 2009/45595; H04L 51/21; H04L 63/00; H04L 63/02; H04L 63/0227; H04L 63/0236; H04L 63/0245; H04L 63/029
See application file for complete search history.

(56) References Cited

U.S. PATENT DOCUMENTS

| | | | | |
|---|---|---|---|---|
| 2016/0119379 A1* | 4/2016 | Nadkarni | ............ | H04L 63/0263 |
| | | | | 726/1 |
| 2018/0091621 A1* | 3/2018 | Kuo | ....................... | H04L 67/565 |
| 2019/0097962 A1* | 3/2019 | Young | ................... | H04L 51/224 |
| 2019/0109714 A1* | 4/2019 | Clark | ..................... | H04L 9/3228 |
| 2020/0236119 A1* | 7/2020 | Chamarajnager | ... | G06F 9/45558 |
| 2020/0241903 A1* | 7/2020 | Wang | .................. | H04L 61/5007 |
| 2021/0149740 A1* | 5/2021 | Jia | ............................ | H04L 67/10 |
| 2021/0326128 A1* | 10/2021 | Malladi | ............... | H04L 12/2823 |
| 2022/0086218 A1* | 3/2022 | Sabella | ............... | H04M 15/66 |
| 2022/0107845 A1* | 4/2022 | Young | ................. | G06F 11/3006 |
| 2022/0116755 A1* | 4/2022 | Filippou | ............... | H04W 60/04 |
| 2022/0182456 A1* | 6/2022 | Shim | ....................... | H04L 67/59 |
| 2022/0353295 A1* | 11/2022 | Yeh | ........................ | H04L 63/029 |
| 2022/0374296 A1* | 11/2022 | Antinori | ................ | G06F 9/546 |
| 2023/0161642 A1* | 5/2023 | Adogla | ................... | G06F 9/541 |
| | | | | 719/328 |
| 2024/0370251 A1* | 11/2024 | Malladi | .................. | G05B 15/02 |
| 2025/0071023 A1* | 2/2025 | Doshi | ................. | G06F 21/6209 |

* cited by examiner

*Primary Examiner* — Kenneth Tang
(74) *Attorney, Agent, or Firm* — King Intellectual Asset Management

(57) ABSTRACT

Aspects of remote edge virtualization management are described. An edge hypervisor shadow application is executed. The edge hypervisor shadow application acts as an Input/Output for an edge hypervisor that is IP inaccessible to a virtualization service. The edge hypervisor shadow application receives a hypertext transport protocol (HTTP) communication from the virtualization service. A Message Queue Telemetry Transport (MQTT) message is generated to include the HTTP request, and is published to an MQTT broker service, the MQTT message comprising the HTTP request.

20 Claims, 4 Drawing Sheets

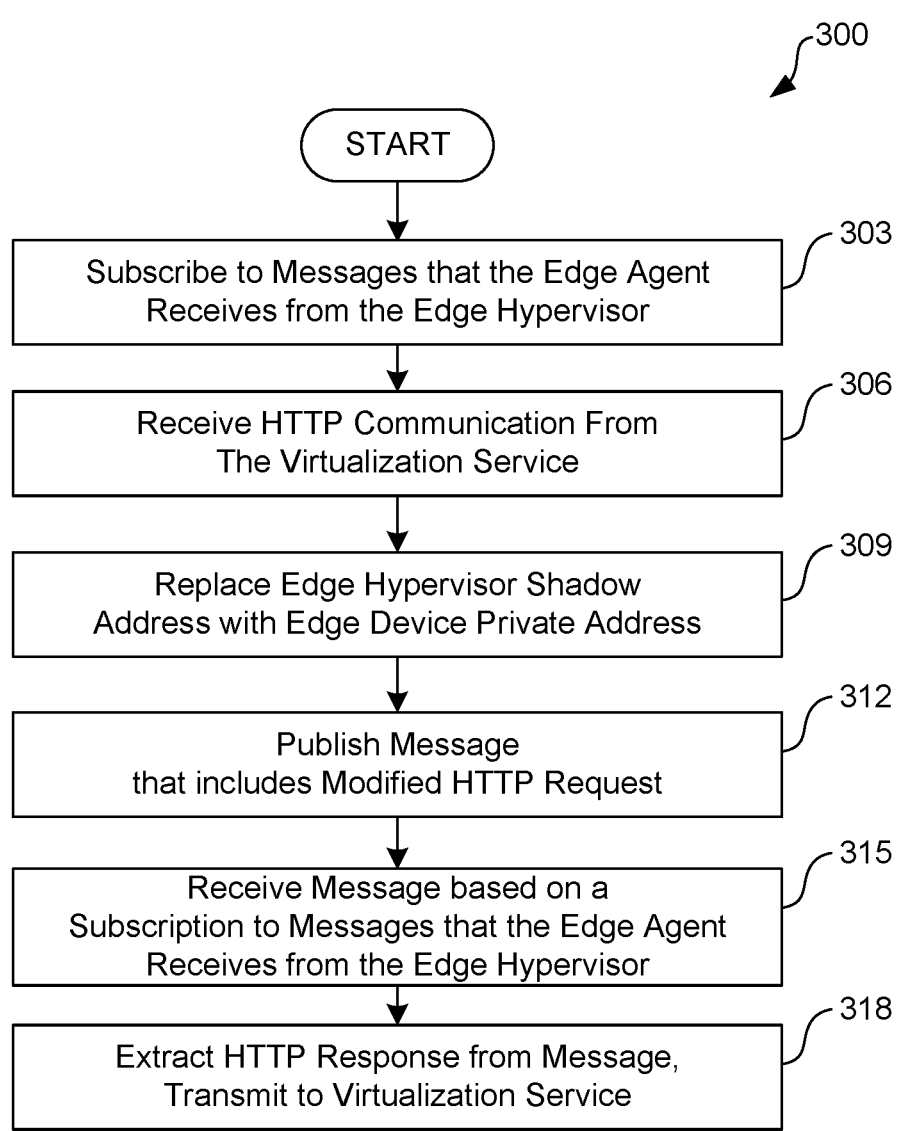

300

START

Subscribe to Messages that the Edge Agent
Receives from the Edge Hypervisor
303

Receive HTTP Communication From
The Virtualization Service
306

Replace Edge Hypervisor Shadow
Address with Edge Device Private Address
309

Publish Message
that includes Modified HTTP Request
312

Receive Message based on a
Subscription to Messages that the Edge Agent
Receives from the Edge Hypervisor
315

Extract HTTP Response from Message,
Transmit to Virtualization Service
318

START

Subscribe to Messages from
Edge Hypervisor Shadow          ┌403

Extract HTTP Request from Message          ┌406

Transmit HTTP Request to Edge Hypervisor          ┌409

Receive HTTP Response From Edge Hypervisor and
Publish Message that includes HTTP Response          ┌412

REMOTE EDGE VIRTUALIZATION MANAGEMENT

CROSS REFERENCE TO RELATED APPLICATIONS

This Application is a § 111(a) Application claiming priority to and benefit of PCT Application No. PCT/CN2022/106455, filed on Jul. 19, 2022 and entitled REMOTE EDGE VIRTUALIZATION MANAGEMENT, the contents of which is hereby incorporated herein by reference in its entirety.

BACKGROUND

Cloud computing systems can extend the capabilities of an organization's data center using computing resources such as virtual machines. A virtualized computing environment can include various host devices that are executing virtual machines that perform various tasks for an enterprise. The virtualized computing environment can support a virtual desktop infrastructure, server infrastructure, user authentication services, security systems, or other computing needs and tasks that might be required by an enterprise. The virtualized computing environment can be managed by a virtualization management system that can manage a virtual infrastructure across a public, private, or hybrid cloud environment. The virtualization management system can also orchestrate containerized execution environments that allow an enterprise to deploy or publish applications, network functions, and other functionalities for its users.

As the workplace environment develops, work locations can change from a single office location, to multiple locations. A modern workplace can also include distribution across remote environments with as few as one employee working from a particular location. Smaller work environments can include private networks whether the private network is in a home, a shared workspace, or another location. Centralized management of virtualization components executing in private networks can be problematic. Private networks can be inaccessible from the public Internet. While one solution is to open the private network so that it is accessible from the Internet, this can introduce security issues for the organization and the end user.

BRIEF DESCRIPTION OF THE DRAWINGS

FIG. 3 is a flowchart illustrating example functionalities performed by components of the networked environment for remote edge virtualization management according to various examples of the disclosure.

DETAILED DESCRIPTION

Figure 1:
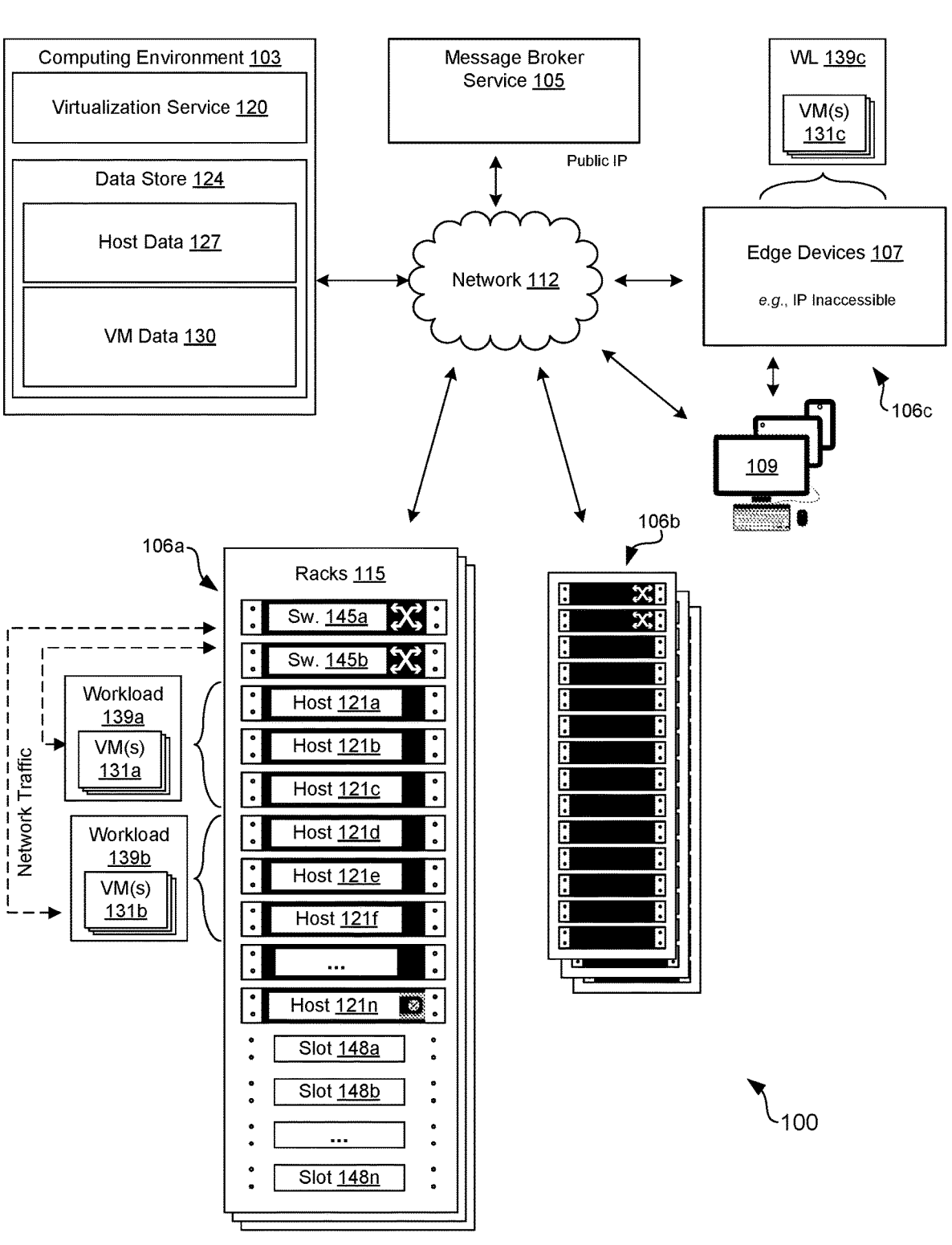
FIG. 1 is an example of a block diagram of a networked environment including a virtualization computing environment according to various examples of the disclosure.

The present disclosure relates to management of virtualization solutions at the edge. This can include placement of workloads, such as virtual machines (VMs), within an edge device that is in a private network that is inaccessible to the virtualization service that manages workload placement, migration, and client device access to the workloads. Edge computing is an emerging aspect of virtualization services. Virtualization technology can offer strong isolation, improved security, workload consolidation, multi-tenancy and other functionalities. However, enabling virtualization at the edge is a challenge. Registration of a remote edge component executed in a private network with a virtualization service executed in a public cloud or another private network can be problematic. The virtualization service can typically address virtualization components such as hypervisors using an Internet Protocol (IP) address that is accessible to the virtualization service. However, the virtualization service cannot address remote edge components such as those executed with in a private network different from the networked environment of the virtualization service. While one solution can be to open a port or otherwise open the private network so that it is IP accessible by the virtualization service, this can introduce security issues. The present disclosure describes mechanisms that can enable the virtualization service to manage virtualization components executed at the edge. These virtualization components can include software and hardware components that are IP inaccessible to the virtualization service. The mechanisms described can enable remote virtualization management seamlessly and without modification of the virtualization service code. For example, the virtualization service can use the described mechanisms to address IP inaccessible hypervisors and other virtualization components as if they were IP accessible.

In some implementations, an edge hypervisor shadow instance can be registered with the virtualization service. The edge hypervisor shadow can act as at least one local Input/Output (I/O) endpoint for an edge hypervisor that is IP inaccessible to the virtualization service. The edge hypervisor shadow can include a lightweight VM that is IP accessible for the virtualization service, and can include the I/O functionalities of the edge hypervisor. The edge hypervisor shadow can be executed within a same host that executes the virtualization service, or in another IP accessible host selected to minimize network latency to the virtualization service.

The virtualization service can communicate with the edge hypervisor shadow using Hypertext Transfer Protocol (HTTP) communications as if the edge hypervisor were IP accessible. The edge hypervisor shadow can convert HTTP communications into a Message Queue Telemetry Transport (MQTT) message, and publish the message to a public MQTT broker in the cloud.

An edge agent can be executed in the private network with the edge hypervisor. The edge agent can subscribe to a topic identifier associated with the edge hypervisor shadow. As a result, the edge agent receives the MQTT message published using this subscription. The local agent will parse the MQTT message and deliver the HTTP communication to the edge hypervisor.

The mechanisms also enable responses and other communications from the edge hypervisor to the virtualization service. For example, the edge hypervisor can provide a response or other HTTP communications to an endpoint of the edge agent. The edge agent can convert the HTTP communications into an MQTT message and publish it to the MQTT broker using another topic identifier. The edge hypervisor shadow can subscribe to the topic identifier associated with the edge hypervisor and/or the edge agent.

As a result, the edge agent receives the MQTT message, extracts the HTTP communication, and delivers it to the appropriate virtualization service endpoint. These functions are described in further detail below with reference to the various figures.

FIG. 1 shows an example of a networked environment 100. The networked environment 100 can include a computing environment 103, a message broker service 105 various computing clusters 106 (e.g., 106*a*, 106*b*), one or more edge devices 107, and one or more client devices 109 in communication with one another over a network 112. The described mechanisms enable remote edge virtualization management seamlessly; without modification of the existing virtualization service 120 code, and without opening a port or otherwise opening the private network so that the edge device 107 is IP accessible to the virtualization service 120.

The network 112 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks. As the networked environment 100 can serve up virtual desktops to end users, the networked environment 100 can also be described as a virtual desktop infrastructure (VDI) environment.

In some examples, the computing environment 103 can include an enterprise computing environment that includes hundreds or even thousands of physical machines, virtual machines, and other software implemented in devices stored in racks 115, distributed geographically across locations or sites that include computing clusters 106 (e.g., computing clusters 106*a*, 106*b*, 106*c*) and are connected to one another through the network 112. It is understood that any virtual machine or virtual appliance is implemented using at least one physical device.

The computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations.

Although shown separately from the computing clusters 106, in some examples, one or more of the computing clusters 106 can be a portion of the computing environment 103. Generally, the computing clusters 106 that are a portion of the computing environment 103 are those that are Internet Protocol (IP) accessible to the virtualization service 120 and all of the hosts 121 of the computing environment 103.

Various applications can be executed on the computing environment 103. For example, a virtualization service 120 can be executed by the computing environment 103. Other applications, services, processes, systems, engines, or functionality not discussed in detail herein may also be executed or implemented by the computing environment 103.

The computing environment 103 can include or be operated as one or more virtualized computer instances. For purposes of convenience, the computing environment 103 is referred to herein in as singular. Even though the computing environment 103 is referred to in the singular, it is understood that a plurality of computing environments 103 can be employed in the various arrangements as described above. As the computing environment 103 communicates with the computing clusters 106 and client devices 109 for end users over the network 112, sometimes remotely, the computing environment 103 can be described as a remote computing environment 103, in some examples. Additionally, in some examples, the computing environment 103 can be implemented in hosts 121 (e.g., 121*a* . . . 121*n*) of a rack 115 and can manage operations of the virtualized computing environment 103. Hence, in some examples, the computing environment 103 can be referred to as a management cluster in the computing clusters 106.

The computing environment 103 can include a data store 124. The data store 124 can include memory of the computing environment 103, mass storage resources of the computing environment 103, or any other storage resources on which data can be stored by the computing environment 103. The data store 124 can include memory of the hosts 121 in some examples. In some examples, the data store 124 can include one or more relational databases, object-oriented databases, hierarchical databases, hash tables or similar key-value data stores, as well as other data storage applications or data structures. The data stored in the data store 124, for example, can be associated with the operation of the various services or functional entities described below. For example, host data 127, virtual machine (VM) data 130, and/or other data can be stored in the data store 124.

In various embodiments, the virtualization service 120 can include a computer program that resides and executes in a central server, which may reside in the computing environment 103, and can run in a VM 131 (e.g., 131*a* . . . 131*c*) in one of hosts 121 or edge devices 107. One example of a virtualization management module or virtualization service is the vCenter Server® product made available from VMware, Inc. The virtualization service 120 is configured to carry out administrative tasks for a virtualized environment, including managing hosts 121, managing workloads 139 (e.g., 139*a* . . . 139*f*), managing VMs 131 running within each host 121, provisioning VMs 131, migrating VMs 131 from one host 121 to another host 121, and load balancing between hosts 121. In one embodiment, the virtualization service 120 can manage and integrate virtual computing resources provided by a third party cloud computing system with virtual computing resources of virtualization service 120 to form a unified "hybrid" computing platform.

The virtualization service 120 includes a resource management service and/or other applications. The resource management service can be executed to allocate workloads 139 (e.g., 139*a* . . . 139*f*) to one or more hosts 121 based on various factors. For example, the resource management service can add an extra host 121 to the set of hosts 121 assigned to a workload 139 in response to an increase in demand for computing resources. As another example, the resource management service can reassign workloads 139 or VMs 131 within a workload 139 from one host 121 to another host 121 in order to more effectively use the hosts 121 assigned to the workload 139.

For example, if a first host 121 is scheduled for an upgrade, the resource management service can reassign VMs 131 executing on the first host 121 to a second host 121 based on various factors that can be used to identify the second host 121 as the best candidate host 121 among other hosts 121 in the data center. The resource management service can include a number of modules and components that work in concert for management of the hosts 121 and workloads 139. For example, the resource management service can include VSphere™ High Availability (HA), VMware Distributed Resource Scheduler (DRS), VMware VCenter™ Server, and other VMware VSphere™ components. The various components of the resource management service can work in concert to achieve the functionalities described for the resource management service.

The host data 127 can contain information about the hosts 121 that are managed by the virtualization service 120. For example, the host data 127 can include information such as the amount of memory installed on the host 121, the number and type of processors installed on the host 121, the number and type of GPUs installed on the host 121, the number and type of network connections installed on the host 121, and various other data. The host data 127 can also include a record of the workload(s) 139 (e.g., specific VMs 131) performed by particular host(s) 121.

VM data 130 represents information about the VMs 131 that are executed by hosts 121 within the virtualized computing environment 103. VM data 130 can include allocated CPU, memory, and storage resources for the various VMs, network configuration for the VMs, or an operating system image for the VMs. VM data 130 can also include certificate data, encryption data, security credentials, or other data needed to configure and operate VMs 131 within the virtualized computing environment 103.

In various embodiments, the computing clusters 106 can include a plurality of devices installed in racks 115, which can make up a server bank, aggregate computing system, or a computer bank in a data center or other like facility. In some examples, the computing cluster can include a high-availability computing cluster. A high-availability computing cluster can include a group of computing devices that act as a single system and can provide a continuous uptime for workloads. The devices in the computing clusters 106 can include any number of physical machines that perform workloads that include, virtual machines, virtual appliances, operating systems, drivers, hypervisors, scripts, and applications.

The devices in the racks 115 can include, for example, memory and storage devices, hosts 121*a* . . . 121*n*, switches 145*a* . . . 145*b*, and other devices. Hosts 121 can include graphics cards having one or more graphics processing units (GPUs) installed thereon, central processing units (CPUs), power supplies, and other components. The devices, such as hosts 121 and switches 145, can have dimensions suitable for quick installation in slots 148*a* . . . 148*n* on the racks 115. In various examples, the hosts 121 can include requisite physical hardware and software to create and manage a virtualization infrastructure. The physical hardware for a host 121 can include a CPU, graphics card (having one or more GPUs), data bus, memory, and other components. In some examples, the hosts 121 can include a pre-configured hyper-converged computing device where a hyper-converged computing device includes pre-tested, pre-configured, and pre-integrated storage, server and network components, including software, that are positioned in an enclosure installed in a slot 148 on a rack 115.

The various physical and virtual components of the computing clusters 106 can process workloads 139. Workloads 139 can represent individual virtual machines 131 and sets of virtual machines 131 executed on the hosts 121. The virtual machines 131 can embody or include various applications that are executed for an organization or enterprise. The virtual machines 131 can provide functionalities including applications, data, and network functions to client devices 109.

In addition to a virtual machine 131, a workload 139 can correspond to other components running on the host 121. These can include one or more containers of Kubernetes® pods, one or more vSAN® components, one or more data transport connections, one or more network functions, and other components. The various components can provide functionalities that can be accessed by various client devices 109 for enterprise purposes.

Workloads 139 can be executed on a host 121 that runs a hypervisor that facilitates access to the physical resources of the host device by workloads 139 running atop the hypervisor. In some examples, the hypervisor can be installed on a host 121 or an edge device 107 to support a virtual machine execution space wherein one or more virtual machines can be concurrently instantiated and executed. In some examples, the hypervisor can include the VMware ESX™ hypervisor, the VMware ESXi™ hypervisor, or similar hypervisor.

A hardware computer device such as a host 121 can execute an instance of one or more virtual machines 131. Each host 121 that acts as a host in the networked environment 100, and thereby includes one or more virtual machines 131, can also include a hypervisor. In some examples, the hypervisor can be installed on a host 121 to support a virtual machine execution space wherein one or more virtual machines 131 can be concurrently instantiated and executed. In some examples, the hypervisor can include the VMware ESX™ hypervisor, the VMware ESXi™ hypervisor, or similar hypervisor. It is understood that the computing clusters 106 are scalable, meaning that the computing clusters 106 in the networked environment 100 can be scaled dynamically to include additional hosts 121, switches 145, power sources, and other components, without degrading performance of the virtualization environment. Further, various physical and virtual components of the computing clusters 106 can process workloads 139. Workloads 139 can refer to the amount of processing that a host 121, switch 145, GPU, or other physical or virtual component has been instructed to process or route at a given time. The workloads 139 can be associated with VMs 131 or other software executing on the hosts 121.

The message broker service 105 can include an MQTT broker that uses an MQTT protocol. The message broker service 105 can also include a messaging broker service that enables publish subscribe messaging using another specified protocol. Publish subscribe messaging provides immediate event notifications to components that are subscribed to a particular topic identifier. To broadcast a message, a component can push or publish a message to the message broker service 105 that includes the topic identifier. The message broker service 105 can immediately relay or push the message to components that have subscribed to the topic identifier.

An edge device 107 can include a host 121 executed outside of the computing environment 103. The edge device 107 can include a switch 145, a router, a gateway device, or another networking device that provides network functions. The edge device 107 can also provide virtual network functions. The edge device 107 can also include a hardware computer device such as a server. The edge device 107 can be a computing device that is part of a private network, and can be IP inaccessible and otherwise inaccessible over a public wide area network (WAN) such as the Internet.

The virtualization service 120 can communicate with the edge device 107 to launch, migrate, and otherwise manage edge workloads 139 including the virtual machines 131*c*. This can include launching and executing virtual machines 131*c* that cause the edge device 107 to provide virtual network functions in association with the edge device 107 and a particular client device 109 that communicates with the edge device 107. The virtualization service 120 can communicate with the edge device 107 to execute and manage edge workloads 139 that provide particular data, virtual network functions, applications, and other enterprise resources accessible to client devices 109 that are connected to a same private network as the edge device 107.

The client device 109 can represent a computing device coupled to the network 112. The client device 109 can be a processor-based computer system. According to various examples, the client device 109 can be in the form of a desktop computer, a laptop computer, a personal digital assistant, a mobile phone, a smartphone, or a tablet computer system. The client device 109 can execute an operating system, such as Windows™, Android™, or iOS®, and has a network interface to communicate with the network 112.

Figure 2:
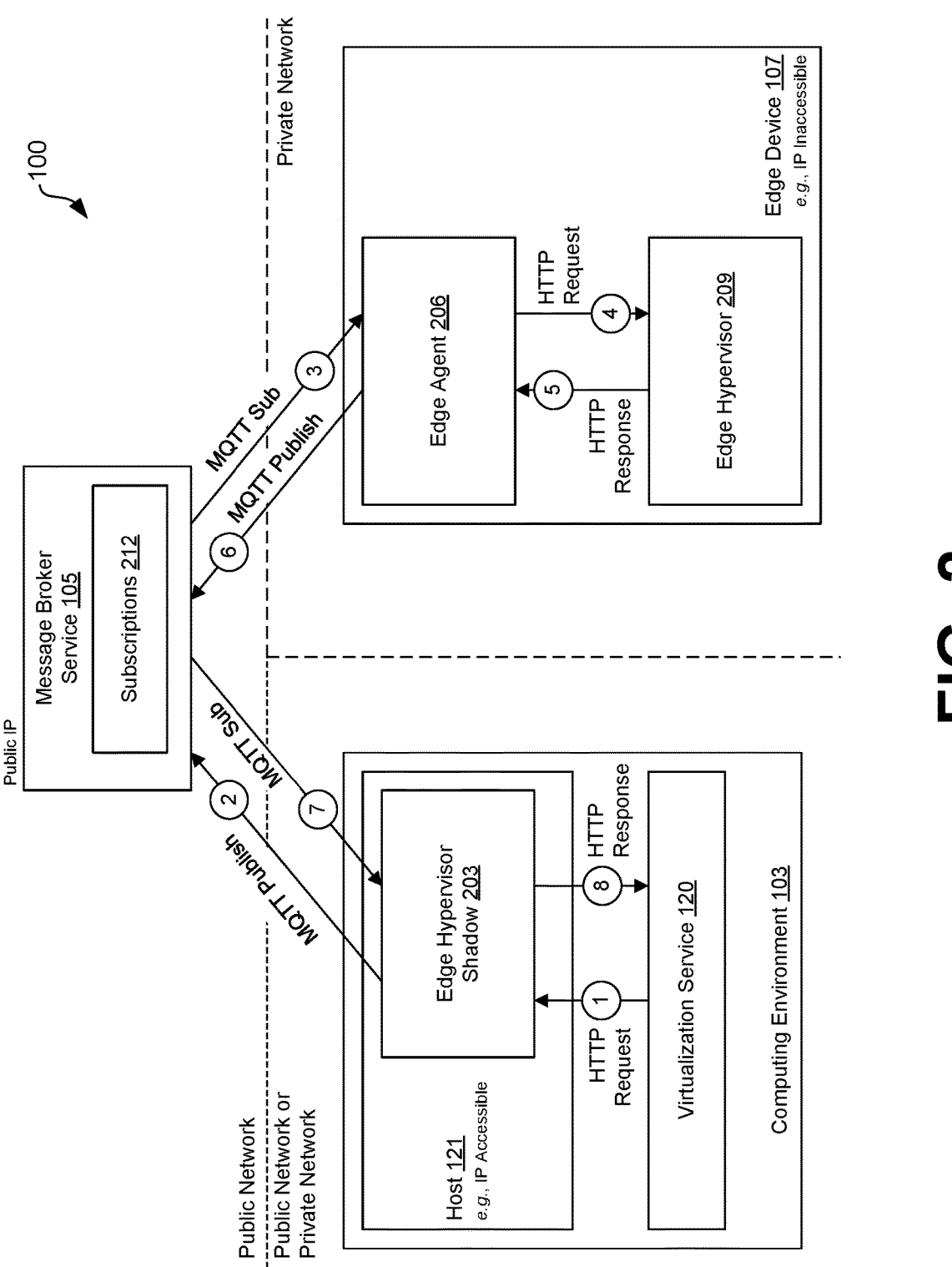
FIG. 2 is a drawing that shows an example of functionalities performed by components of the networked environment for remote edge virtualization management according to various examples of the disclosure.

FIG. 2 shows an example of functionalities performed by components of the networked environment 100 for remote edge virtualization management. The networked environment 100 shows the computing environment 103, the message broker service 105, and the edge device 107. The described mechanisms enable remote edge virtualization management seamlessly; without modification of the existing virtualization service 120 code, and without opening a port or otherwise opening the private network so that the edge device 107 is IP accessible to the virtualization service 120.

While the message broker service 105 is discussed in this example as an MQTT broker that facilitates MQTT messaging, the message broker service 105 can include a broker that uses another protocol such as Constrained Application Protocol (CoAP), Advanced Message Queuing Protocol (AQMP), Data Distribution Service (DDS), RabbitMQ, REpresentational State Transfer (REST), Extensible Messaging and Presence Protocol (XMPP), Google Cloud Messaging, Kafka, and others.

The computing environment 103 can include the virtualization service 120 and the host device 121. The computing environment 103 can include components that connect to a private network such as a private local area network (LAN) or a private WAN. The computing environment 103 can also include components that connect to a public WAN such as the Internet. For example, the virtualization service 120 can be executed and limited to access from the private network such as a particular location or set of locations. Alternatively, the virtualization service 120 can be executed as a cloud service accessible over the Internet.

The host 121 can include the edge hypervisor shadow 203. The edge hypervisor shadow 203 can include a software component that is logically associated with the edge hypervisor 209. The host 121 can be computing device that is IP accessible to the virtualization service 120. As a result, the virtualization service 120 can transmit HTTP communications such as commands, requests, and other communications to an endpoint of the edge hypervisor shadow 203.

The virtualization service 120 can be executed in whole or in part by the same host 121 that executes the edge hypervisor shadow 203. This can minimize latency between the virtualization service 120 and the edge hypervisor shadow 203. Otherwise, the virtualization service 120 can identify a set of hosts 121 that have available hardware resources to execute the edge hypervisor shadow 203, select the host 121 with a minimum latency, and launch the edge hypervisor shadow 203 within a VM 131 on the host 121.

The edge device 107 can connect to a private network, or can otherwise be IP inaccessible to the virtualization service 120. If the virtualization service 120 is in a private network and is not accessible over a public network, then its private network is different from the private network of the edge device 107. The edge device 107 can include an edge agent 206 and the edge hypervisor 209. The edge device 107 and the components that it executes can be IP inaccessible to the virtualization service 120. The edge agent 206 can be executed in a virtual machine 131 or otherwise using the same edge device 107 as the edge hypervisor 209. In an alternative embodiment, the edge agent 206 can be executed in a host 121, another edge device 107, or otherwise in the same private network as the edge hypervisor 209. In other words, the edge agent 206 can be executed in any computing device that is IP accessible to the edge hypervisor 209 and IP inaccessible to the virtualization service 120.

The message broker service 105 can include subscription data 212. The message broker service 105 can include a number of message topics registered in association with a number of publishers. The publishers can include the edge hypervisor shadow 203 and the edge agent 206. The edge hypervisor shadow 203 can register with the message broker service 105 as a publisher of a topic. The topic identifier registered to the edge hypervisor shadow 203 can be referred to as a "hypervisor shadow" topic identifier. The edge hypervisor shadow 203 can publish request messages from the virtualization service 120 to the edge hypervisor 209 that includes a device identifier of the edge device 107, a request identifier of a request from the virtualization service 120, and the hypervisor shadow topic identifier (e.g., "/DeviceID/RequestID/HypervisorShadowTopicID").

The edge agent 206 can register with the message broker service 105 as a publisher of a topic. The topic identifier registered to the edge agent 206 can be referred to as an "edge agent" topic identifier. The edge agent 206 can publish request messages from the edge hypervisor 209 to the virtualization service 120 that include a device identifier of the edge device 107, a response identifier, and the edge topic identifier (e.g., "/DeviceID/ReponseID/EdgeAgentTopicID").

The message broker service 105 can receive a request from the edge hypervisor shadow 203 to subscribe to messages published to the edge agent topic identifier by the edge agent 206. The message broker service 105 can store this as subscription data 212. The message broker service 105 can also receive a request from the edge agent 206 to subscribe to messages published to another topic identifier by the edge hypervisor shadow 203.

The virtualization service 120 can communicate with the edge HTTP communications that are intended for the edge hypervisor 209. From the perspective of the virtualization service 120, it appears that the edge hypervisor 209 is IP accessible. This arrangement allows the unmodified virtualization service 120 to manage virtualization of IP inaccessible components while communicating with the IP accessible edge hypervisor shadow 203.

The edge hypervisor shadow 203 can be registered with the virtualization service 120 as if it were the edge hypervisor 209. The edge hypervisor shadow 203 can act as a local IO endpoint for the edge hypervisor 209 that is IP inaccessible to the virtualization service 120. The edge hypervisor shadow 203 can include a lightweight VM 131 that is IP accessible to the virtualization service 120. The edge hypervisor shadow 203 can include the IO functions of the edge hypervisor 209. In this context, an example of the operation of these components can include steps or actions 1 through 8.

In step 1, the virtualization service 120 can transmit an HTTP request to the edge hypervisor shadow 203 that is registered with the virtualization service 120 and associated with the edge hypervisor 209. The edge hypervisor shadow 203 can receive the HTTP request. The HTTP request can include address data such as a local or public IP address, a URL, URI, or other address data that addresses an endpoint provided using the host 121 and the edge hypervisor shadow 203. This initial address data can include public address data or private address data among the various embodiments. The edge hypervisor shadow 203 can modify the HTTP request into a modified HTTP request by replacing the initial address data with private endpoint address data that addresses the IP inaccessible edge device 107 and the edge agent 206. The updated address data can include a private IP address. In alternative examples, the edge agent 206 can perform the address replacement action.

In step 2, the edge hypervisor shadow 203 can publish the HTTP request in a "request" MQTT message that wraps the HTTP request. The edge hypervisor shadow 203 can publish this message to the topic or topic identifier to which the edge agent 206 subscribes according to the subscription data 212.

In step 3, the message broker service 105 can relay the request MQTT message to the edge agent 206 according to the subscription data 212. In other words, the message broker service 105 can identify that the edge agent 206 subscribes to this topic identifier, and can push or transmit the request MQTT message to the edge agent 206.

In step 4, the edge agent 206 can extract the HTTP request from the request MQTT message and transmit it to the edge hypervisor 209. The edge hypervisor 209 can process the HTTP request by performing an action or command specified. As indicated above, in some examples the edge agent 206 can modify the HTTP request to include the private IP address.

In step 5 the edge hypervisor 209 can transmit an HTTP response to the edge agent 206. The edge agent 206 can insert or wrap the HTTP response in a MQTT message that can be referred to as a "response" MQTT message based on its inclusion of the HTTP response. In some examples, the edge agent 206 can modify address data in the HTTP request from an endpoint address of the edge agent 206 and the edge device 107 to an endpoint address of the virtualization service 120 and its host. In other examples, the edge hypervisor shadow 203 can perform this functionality.

In step 6, the edge agent 206 can publish the response MQTT message that includes the HTTP response to a topic identifier to which the edge hypervisor shadow 203 subscribes.

In step 7, the message broker service 105 can relay the response MQTT message to the edge hypervisor shadow 203 according to its subscription data 212. In other words, the message broker service 105 can identify that the edge hypervisor shadow 203 subscribes to this topic identifier, and can push or transmit the response MQTT message to the edge hypervisor shadow 203.

In step 8, the edge hypervisor shadow 203 can extract the HTTP response from the response MQTT message and transmit it to the edge hypervisor 209. The edge hypervisor 209 can process the HTTP request by performing an action or command specified. As indicated above, in some examples the edge agent 206 can modify the HTTP request to include the private IP address of the virtualization service 120 and its host.

FIG. 3 is a flowchart 300 that shows functionalities performed by components of the networked environment 100. Specifically, the flowchart 300 shows how the edge hypervisor shadow 203 can facilitate remote edge virtualization management of components that are IP inaccessible to the virtualization service 120. While the actions of the steps can be described as performed by the edge hypervisor shadow 203, other components of the networked environment 100 can also perform aspects of the steps and actions.

In step 303, the edge hypervisor shadow 203 can subscribe to messages that the edge agent 206 receives from the edge hypervisor 209. The edge hypervisor shadow 203 can transmit a request to the message broker service 105 that subscribes to a topic identifier or topic uniquely associated with one or more of the edge agent 206 and the edge hypervisor 209. The message broker service 105 can maintain subscription data 212 that causes the message broker service 105 to push or otherwise transmit messages published to the edge hypervisor's 209 topic identifier.

In step 306, the edge hypervisor shadow 203 can receive an HTTP request or another HTTP communication from the virtualization service 120. The HTTP request can be transmitted by the virtualization service 120 as if the edge hypervisor shadow 203 were actually the edge hypervisor 209. However, the HTTP request can include a URL, URI, IP address, or address data that addresses the edge hypervisor shadow 203. The HTTP request can include a virtualization command such as a command to start execution of a VM 131, provide data associated with a VM 131, stop execution of a VM 131, delete a VM 131, migrate a VM 131, and so on.

In step 309, the edge hypervisor shadow 203 can replace the edge hypervisor shadow address data with a private IP address of the edge hypervisor 209. Since edge hypervisor shadow 203 can be a "shadow" or IO emulation for a specific edge hypervisor 209, it can include data that specifies this private IP address. The private IP address of the edge hypervisor 209 can be IP inaccessible to the edge hypervisor shadow 203 as well as the virtualization service 120.

In step 312, the edge hypervisor shadow 203 can publish a message that includes the modified HTTP request. Alternatively, the message can include the unmodified HTTP request, and the edge agent 206 can modify the HTTP request upon receipt. The edge hypervisor shadow 203 can publish the message to the message broker service 105. The edge agent 206 can be subscribed a topic identifier uniquely associated with one or more of the edge hypervisor shadow 203 and the virtualization service 120. The edge hypervisor shadow 203 can publish the message along with this identifier. The message broker service 105 can relay the message to the edge agent 206, and the edge agent 206 can transmit the HTTP request to the edge hypervisor 209, which can respond with an HTTP response. The edge agent 206 can wrap this HTTP response in a message such as an MQTT message and publish it to the topic identifier uniquely associated with the edge hypervisor 209.

In step 315, the edge hypervisor shadow 203 can receive a message based on the subscription to messages that the edge agent 206 receives from the edge hypervisor 209. In other words, the edge hypervisor shadow 203 can receive a message that is published by the edge agent 206 and specifies the topic identifier uniquely associated with the edge hypervisor 209.

In step 318, the edge hypervisor shadow 203 can extract the HTTP response from the message, and transmit it to the virtualization service 120. In some examples, the edge hypervisor shadow 203 can modify address data in the HTTP response from an address of the edge agent 206 to an address of the virtualization service 120.

Figure 4:
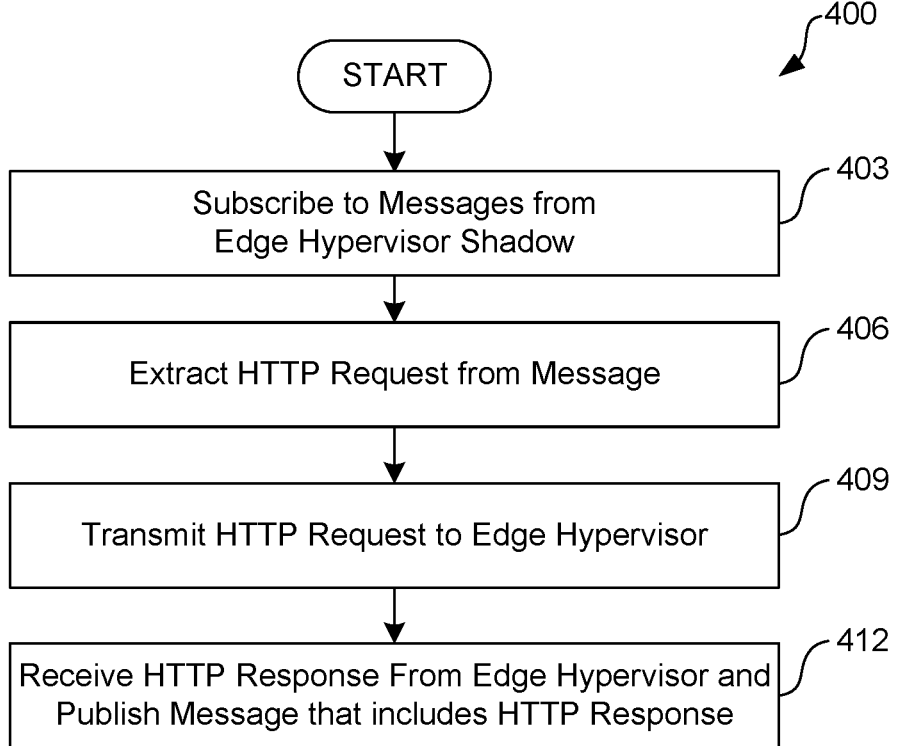
FIG. 4 is a flowchart illustrating additional example functionalities performed by components of the networked environment for remote edge virtualization management according to various examples of the disclosure.

FIG. 4 is a flowchart 400 that shows functionalities performed by components of the networked environment 100. Specifically, the flowchart 400 shows how the edge agent 206 can facilitate remote edge virtualization management of components that are IP inaccessible to the virtualization service 120. While the actions of the steps can be described as performed by the edge agent 206, other components of the networked environment 100 can also perform aspects of the steps and actions.

In step 403, the edge agent 206 can subscribe to messages that the edge hypervisor shadow 203 receives from the virtualization service 120 on behalf of the edge hypervisor 209. The edge agent 206 can transmit a request to the message broker service 105 that subscribes to a topic identifier uniquely associated with one or more of the edge hypervisor shadow 203, corresponding to a set of messages from the virtualization service 120 to the edge hypervisor 209. The message broker service 105 can maintain subscription data 212 that causes the message broker service 105 to push or otherwise transmit messages published to the edge hypervisor shadow's 203 topic identifier.

In step 406, the edge agent 206 can extract an HTTP request from a message received based on the edge hypervisor shadow's 203 topic. In some examples, this can be an HTTP request that is already modified by the edge hypervisor shadow 203 to specify an IP address of the edge hypervisor 209. However, in other examples, the edge agent 206 can modify the HTTP request extracted from the message to specify the IP address of the edge hypervisor 209 rather than the address of the edge agent 206.

In step 409, the edge agent 206 can transmit the modified HTTP request to the edge hypervisor 209. The edge hypervisor 209 can perform a virtualization action or command specified by the HTTP request, and can return an HTTP response to the edge agent 206.

In step 412, the edge agent 206 can receive the HTTP response from the edge hypervisor 209 and publish a message that includes this HTTP response. The edge agent 206 can publish the message using a topic identifier uniquely associated with the edge hypervisor 209. Since the edge hypervisor shadow 203 can be subscribed to this topic, the message broker service 105 can push the message to the edge hypervisor shadow 203, which can extract the HTTP response and provide it to the virtualization service 120. In some examples, the edge agent 206 can modify the HTTP response to change an address of the edge agent 206 to an address of the virtualization service 120. Alternatively, the edge hypervisor shadow 203 can receive an unmodified HTTP response and can perform this address change prior to delivery to the virtualization service 120.

Functionality attributed to the executable components discussed herein can be implemented in a single process or application or in multiple processes or applications. The separation or segmentation of functionality as discussed herein is presented for illustrative purposes only.

Flowcharts and sequence diagrams can show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams can show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing devices and other hardware components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the various executable software components can be stored in one or more storage devices and be executable by one or more processors. Also, a data store can be stored in the one or more storage devices.

The functionalities described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refers to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A system, comprising:
at least one computing device comprising one or more processors; and
instructions executable by the one or more processors to cause the at least one computing device perform operations comprising
executing an edge hypervisor shadow application that provides Input/Output (I/O) functionalities for an edge hypervisor that is IP inaccessible to a virtualization service, wherein the edge hypervisor shadow application is IP accessible to the virtualization service;
receiving, by the edge hypervisor shadow application, a hypertext transport protocol (HTTP) request from the virtualization service, wherein the HTTP request comprises virtualization instructions for the edge hypervisor;
generating, by the edge hypervisor shadow application, a Message Queue Telemetry Transport (MQTT) message that includes the HTTP request; and
publishing, by the edge hypervisor shadow application to an MQTT broker service, the MQTT message that includes the HTTP request;
receiving, by the edge hypervisor shadow application, a response MQTT message comprising an HTTP response that the edge hypervisor generates in response to the HTTP request;
extracting, by the edge hypervisor shadow application, the HTTP response from the MQTT message; and
transmitting, by the edge hypervisor shadow application, the HTTP response to the virtualization service.

2. The system of claim 1, wherein the edge hypervisor shadow application publishes the MQTT message to a topic identifier that an edge agent subscribes to, wherein the edge hypervisor is IP accessible to the edge agent.

3. The system of claim 1, wherein the edge hypervisor shadow application generates the MQTT message by modifying the HTTP request by replacing a network address of the edge hypervisor shadow application with a private IP address of the edge hypervisor.

4. The system of claim 1, wherein the edge hypervisor shadow application is deployed within a virtual machine that is executed in a host device that is IP accessible to the virtualization service.

5. The system of claim 1, wherein the operations further comprise:
subscribing, by the edge hypervisor shadow application, to a topic identifier uniquely associated with the edge hypervisor.

6. The system of claim 1, wherein the edge hypervisor shadow application runs on a host selected by the virtualization service.

7. The system of claim 1 wherein the operations further comprise:
registering, by the edge hypervisor shadow application, as the edge hypervisor with the virtualization service; and
communicating, by the edge hypervisor shadow application, with the virtualization service as a local Input/ Output (I/O) endpoint for the edge hypervisor.

8. A method, comprising:
executing an edge hypervisor shadow application that provides Input/Output (I/O) functionalities for an edge hypervisor that is IP inaccessible to a virtualization service, wherein the edge hypervisor shadow application is IP accessible to the virtualization service;
receiving, by the edge hypervisor shadow application, a hypertext transport protocol (HTTP) request from the virtualization service, wherein the HTTP request comprises virtualization instructions for the edge hypervisor;
generating, by the edge hypervisor shadow application, a Message Queue Telemetry Transport (MQTT) message that includes the HTTP request;
publishing, by the edge hypervisor shadow application to an MQTT broker service, the MQTT message that includes the HTTP request;
receiving, by the edge hypervisor shadow application, a response MQTT message comprising an HTTP response that the edge hypervisor generates in response to the HTTP request;
extracting, by the edge hypervisor shadow application, the HTTP response from the MQTT message; and
transmitting, by the edge hypervisor shadow application, the HTTP response to the virtualization service.

9. The method of claim 8, wherein the edge hypervisor shadow application publishes the MQTT message to a topic identifier that an edge agent subscribes to, wherein the edge hypervisor is IP accessible to the edge agent.

10. The method of claim 8, wherein the edge hypervisor shadow application generates the MQTT message by modifying the HTTP request by replacing a network address of the edge hypervisor shadow application with a private IP address of the edge hypervisor.

11. The method of claim 8, wherein the edge hypervisor shadow application is deployed within a virtual machine that is executed in a host device that is IP accessible to the virtualization service.

12. The method of claim 8, further comprising:

subscribing, by the edge hypervisor shadow application, to a topic identifier uniquely associated with the edge hypervisor.

13. The method of claim 8, wherein the edge hypervisor shadow application runs on a host selected by the virtualization service.

14. The method of claim 8, further comprising:

registering, by the edge hypervisor shadow application, as the edge hypervisor with the virtualization service; and communicating, by the edge hypervisor shadow application, with the virtualization service as a local Input/Output (I/O) endpoint for the edge hypervisor.

15. A non-transitory computer readable medium embodying instructions executable by one or more processors to perform operations comprising:

executing an edge hypervisor shadow application that provides Input/Output (I/O) functionalities for an edge hypervisor that is IP inaccessible to a virtualization service, wherein the edge hypervisor shadow application is IP accessible to the virtualization service;

receiving, by the edge hypervisor shadow application, a hypertext transport protocol (HTTP) request from the virtualization service, wherein the HTTP request comprises virtualization instructions for the edge hypervisor;

generating, by the edge hypervisor shadow application, a Message Queue Telemetry Transport (MQTT) message that includes the HTTP request;

publishing, by the edge hypervisor shadow application to an MQTT broker service, the MQTT message that includes the HTTP request;

receiving, by the edge hypervisor shadow application, a response MQTT message comprising an HTTP response that the edge hypervisor generates in response to the HTTP request;

extracting, by the edge hypervisor shadow application, the HTTP response from the MQTT message; and transmitting, by the edge hypervisor shadow application, the HTTP response to the virtualization service.

16. The non-transitory computer readable medium of claim 15, wherein the edge hypervisor shadow application publishes the MQTT message to a topic identifier that an edge agent subscribes to, wherein the edge hypervisor is IP accessible to the edge agent.

17. The non-transitory computer readable medium of claim 15, wherein the edge hypervisor shadow application generates the MQTT message by modifying the HTTP request by replacing a network address of the edge hypervisor shadow application with a private IP address of the edge hypervisor.

18. The non-transitory computer readable medium of claim 15, wherein the edge hypervisor shadow application is deployed within a virtual machine that is executed in a host device that is IP accessible to the virtualization service.

19. The non-transitory computer readable medium of claim 18, wherein the operations further comprise:

subscribing, by the edge hypervisor shadow application, to a topic identifier uniquely associated with the edge hypervisor; and receiving, by the edge hypervisor shadow application, a response MQTT message comprising an HTTP response that the edge hypervisor generates in response to the HTTP request.

20. The non-transitory computer readable medium of claim 15, wherein the edge hypervisor shadow application runs on a host selected by the virtualization service.

* * * * *